United States Patent
Altendahl et al.

(10) Patent No.: US 6,970,825 B1
(45) Date of Patent: Nov. 29, 2005

(54) PLANNING ENGINE FOR A PARCEL SHIPPING SYSTEM

(75) Inventors: James R. Altendahl, Eagan, MN (US); Steven R. Lent, Burnsville, MN (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/475,880

(22) Filed: Dec. 30, 1999

(51) Int. Cl.$^7$ .............................................. G06F 17/60
(52) U.S. Cl. .......................................... 705/1; 705/26
(58) Field of Search .................................. 705/1, 7–13

(56) References Cited

U.S. PATENT DOCUMENTS

| | | | |
|---|---|---|---|
| 4,628,435 A | 12/1986 | Tashiro et al. | |
| 5,117,364 A | 5/1992 | Barns-Slavin et al. | 364/464.03 |
| 5,124,926 A | 6/1992 | Barns-Slavin et al. | 364/464.03 |
| 5,222,018 A | 6/1993 | Sharpe et al. | 364/406 |
| 5,481,464 A | 1/1996 | Ramsden | 364/464.03 |
| 5,631,827 A * | 5/1997 | Nicholls et al. | 235/385 |
| 5,666,493 A * | 9/1997 | Wojcik et al. | 705/22 |
| 5,729,459 A | 3/1998 | Brandien et al. | 364/464.12 |
| 5,729,460 A | 3/1998 | Plett et al. | |
| 5,786,993 A | 7/1998 | Frutiger et al. | |
| 5,869,819 A | 2/1999 | Knowles et al. | 235/375 |
| 5,923,017 A | 7/1999 | Bjorner et al. | 235/385 |
| 5,969,819 A | 10/1999 | Wang | 356/371 |
| 5,995,950 A | 11/1999 | Barns-Slavin et al. | 705/402 |
| 6,018,725 A | 1/2000 | Boucher et al. | 705/401 |
| 6,036,348 A | 3/2000 | Miura | 364/478.13 |
| 6,041,318 A | 3/2000 | Danford-Klein et al. | 705/400 |

(Continued)

FOREIGN PATENT DOCUMENTS

FR   0 333 043 A1   3/1989   ........... G06F 15/21

(Continued)

OTHER PUBLICATIONS

Bagchi and Davis, Some Insights Into Inbound Freight Consolidation, 1998, International Journal of Physical & Materials.*

(Continued)

*Primary Examiner*—John G. Weiss
*Assistant Examiner*—Naresh Vig
(74) *Attorney, Agent, or Firm*—Brian A. Lemm; Angelo N. Chaclas

(57) ABSTRACT

A planning engine for use in a planning system which is in turn used to plan shipment of a parcel of at least one item, the planning including routing and rating the shipment. The planning system, of which the planning engine is a component, includes a router for determining possible routes for the shipment (each route a carrier and a service), a rater for rating each possible route, a consolidator for attempting to consolidate a list of shipments, and a prorater for allocating costs of a consolidation among the consolidated shipments, and also has read and write access to a shipping database. Its component planning engine includes: an input module for providing a list including each shipment for which planning is to be performed; a load list template builder, responsive to the list including each shipment for which planning is to be performed, for providing a load list template indicating at least one load, each load having an associated stop, each stop having an associated shipment, each shipment having at least one associated item; an analyzer, responsive to the load list template, for planning in turn how to ship each of the shipments indicated by the load list template by making use of the router and the rater, for providing a load list indicating a carrier and service for each shipment of the load list template; and an output module, for providing the load list in a manner corresponding to the form of the planning request information.

2 Claims, 5 Drawing Sheets

U.S. PATENT DOCUMENTS

| | | | |
|---|---|---|---|
| 6,064,981 | A | 5/2000 | Barni et al. |
| 6,064,994 | A | 5/2000 | Kubatzki .................... 235/275 |
| 6,078,889 | A | 6/2000 | Boucher et al. ................ 705/1 |
| 6,230,872 | B1 | 5/2001 | Huang et al. ............... 198/368 |
| 6,233,568 | B1 | 5/2001 | Kara .......................... 705/410 |
| 6,286,009 | B1 | 9/2001 | Mattioli, Jr. et al. ........ 707/102 |
| 6,304,856 | B1 * | 10/2001 | Soga et al. ................... 705/28 |
| 6,304,857 | B1 | 10/2001 | Heindel et al. ............... 705/34 |
| 6,317,728 | B1 | 11/2001 | Kane |
| 6,321,214 | B1 * | 11/2001 | Thiel .......................... 705/408 |
| 6,321,992 | B1 | 11/2001 | Knowles et al. ....... 235/478.01 |
| 6,401,078 | B1 * | 6/2002 | Roberts et al. ............... 705/28 |
| 6,424,948 | B1 | 7/2002 | Dong et al. |
| 6,456,986 | B1 | 9/2002 | Boardman et al. |
| 2002/0087375 | A1 | 7/2002 | Griffin et al. .................. 705/7 |
| 2002/0174030 | A1 | 11/2002 | Praisner et al. |

FOREIGN PATENT DOCUMENTS

| | | | | |
|---|---|---|---|---|
| GB | 0 765 813 A2 * | 4/1997 | .......... | B65B 57/00 |

OTHER PUBLICATIONS

Arcelus, F.J., Rowcroft, J.E., "Freight Rates for Small Shipments", Jul. 1993, International Journal of Production Economics, vol. 30-31, pp. 571-577.

Stahl, Stephanie, "Information is Part of the Package—Package Delivery Companies are Using Innovative Technologies to Provide More Information to Customers", Information Week, 1996 n 596, p. 206

Chabrow, Eric R., "Shipment Tracking—Data is Part of the Package-UPS and Rivals Offer Services to Help Clients Track Their Shipments", Information Week, 1995, n 559, p. 43.

Frook, John Evan, "Moving To A FedEx-tranet", Internet Week, 1997, n 695, p. 1, Dec. 22, 1997.

* cited by examiner

PLANNING ENGINE FOR A PARCEL SHIPPING SYSTEM

CROSS REFERENCE TO RELATED APPLICATIONS

The present invention is related to the following U.S. applications: U.S. application Ser. No. 09/476,717 filed Dec. 30, 1999 entitled, "A SYSTEM FOR MANAGING PARCEL SHIPPING"; U.S. application Ser. No. 09/475,883 filed Dec. 30, 1999 entitled, "A RATER UTILITY FOR A PARCEL SHIPPING SYSTEM"; U.S. application Ser. No. 09/475,882 filed Dec. 30, 1999 entitled, "A ROUTER UTILITY FOR A PARCEL SHIPPING SYSTEM" and U.S. application Ser. No. 09/475,881 filed Dec. 30, 1999 entitled, "A LOAD PLANNING DATABASE FOR A PARCEL SHIPPING SYSTEM".

All of the applications are assigned to the present assignee and filed on the same date hereof. The subject matter of each of these applications is hereby incorporated by reference.

FIELD OF THE INVENTION

The present invention pertains to the field of software engineering for parcel shipping, and more particularly to planning the shipping of parcels, including performing routing and rating for the shipping of parcels.

BACKGROUND OF THE INVENTION

Companies that provide items such as finished goods or raw materials have a lot of choice in how the items are shipped (in the sense of parcel shipping). If choices are made correctly, the shipper can realize significant savings. The choices, however, are complex enough that having to analyze options for any particular shipping requirement is likely to overwhelm the typical shipping department employee. Although making a choice in how to ship a parcel could be automated for any particular shipper (the sender, not the carrier), the cost of doing so is great enough that most shippers would be reluctant to go ahead with automating the shipping options analysis.

The principal elements of planning the shipping of a parcel or a batch of parcels are first, determining a route for the parcel or each parcel in a batch of parcels (called routing), and second, determining a rate for the parcel or for each parcel in the batch of parcels. In planning for a single parcel, only routing and rating are performed. In planning for shipping a batch of parcels, it is also desirable to examine opportunities to consolidate the parcels, and if some shipments can be consolidated, to prorate the costs of shipping each consolidated parcel (i.e. to apportion the costs of a load of several consolidated shipments of parcels among the individual parcels).

Given an overall system for managing parcel shipping, such as that disclosed in the related application, "SYSTEM FOR MANAGING PARCEL SHIPPING," what is needed is a planning module for helping analyze the many options available for shipping a parcel of items, and ideally one that is versatile enough, in how it can plan for shipping a parcel, that it is suitable for a great many different kinds of shipper.

Further what is needed is a planning module that can be used (called) either to plan for shipping either a particular parcel, or to plan for shipping a batch of parcels.

Still further what is needed is a planning module that can acquire inputs used in planning a shipment or shipments either from non-volatile memory (such as from a database stored on a computer disc storage device) or from volatile memory (RAM).

Still further what is needed is a planning module that can be called by other modules without its having to be included in a single build of a comprehensive module (in the sense of components linked together in a static build) including the calling modules and the planning module.

Still further what is needed is a planning module that itself can call other modules each providing a specific service, such as a routing service or a rating service, without having to be included in a single (statically linked) build of a comprehensive module including the planning modules and the modules it calls for services.

SUMMARY OF THE INVENTION

Accordingly, the present invention provides a planning engine for use in a planning system which is in turn used to plan shipment of a parcel of at least one item, the planning including routing and rating the shipment. The planning system, of which the planning engine is a component, includes a router for determining possible routes for the shipment, a rater for rating each possible route, a consolidator for attempting to consolidate a list of shipments, and a prorater for allocating costs of a consolidation among the consolidated shipments, the planning system also having read and write access to a shipping database. The planning engine includes: an input module, responsive to a planning request indicating at least one shipment for which planning is to be performed, the planning request being provided in either one of at least two forms, the input module for providing a list including each shipment for which planning is to be performed; a load list template builder, responsive to the list including each shipment for which planning is to be performed, for providing a load list template indicating at least one load, each load having an associated stop, each stop having an associated shipment, each shipment having at least one associated item; an analyzer, responsive to the load list template, for planning in turn how to ship each of the shipments indicated by the load list template by making use of the router and the rater, for providing a load list indicating a carrier and service for each shipment of the load list template; and an output module, responsive to the load list, for providing the load list in a manner corresponding to the form of the planning request information.

In a further aspect of the invention, the planning engine is implemented as a component object module (COM) server.

In a still further aspect of the invention, the planning engine passes the router the load list template and the router then determines possible routes for each load of the load list template, the router referring to business rules and to a means for prioritizing the business rules in case of conflict, the router returning to the planning engine a carrier list indicating acceptable routes in terms of a list of carriers and one or more services for each carrier.

In yet a still further aspect of the invention, the planning engine passes the rater the carrier list and the rater then provides component costs for each of the acceptable routes, and the planning engine then selects a route from the list of acceptable routes.

In yet even a still further aspect of the invention, the planning engine passes the consolidator the load list template indicating each shipment as a direct shipment and the consolidator provides in return a consolidation load list.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The Overall System for Managing Parcel Shipping

Figure 1:
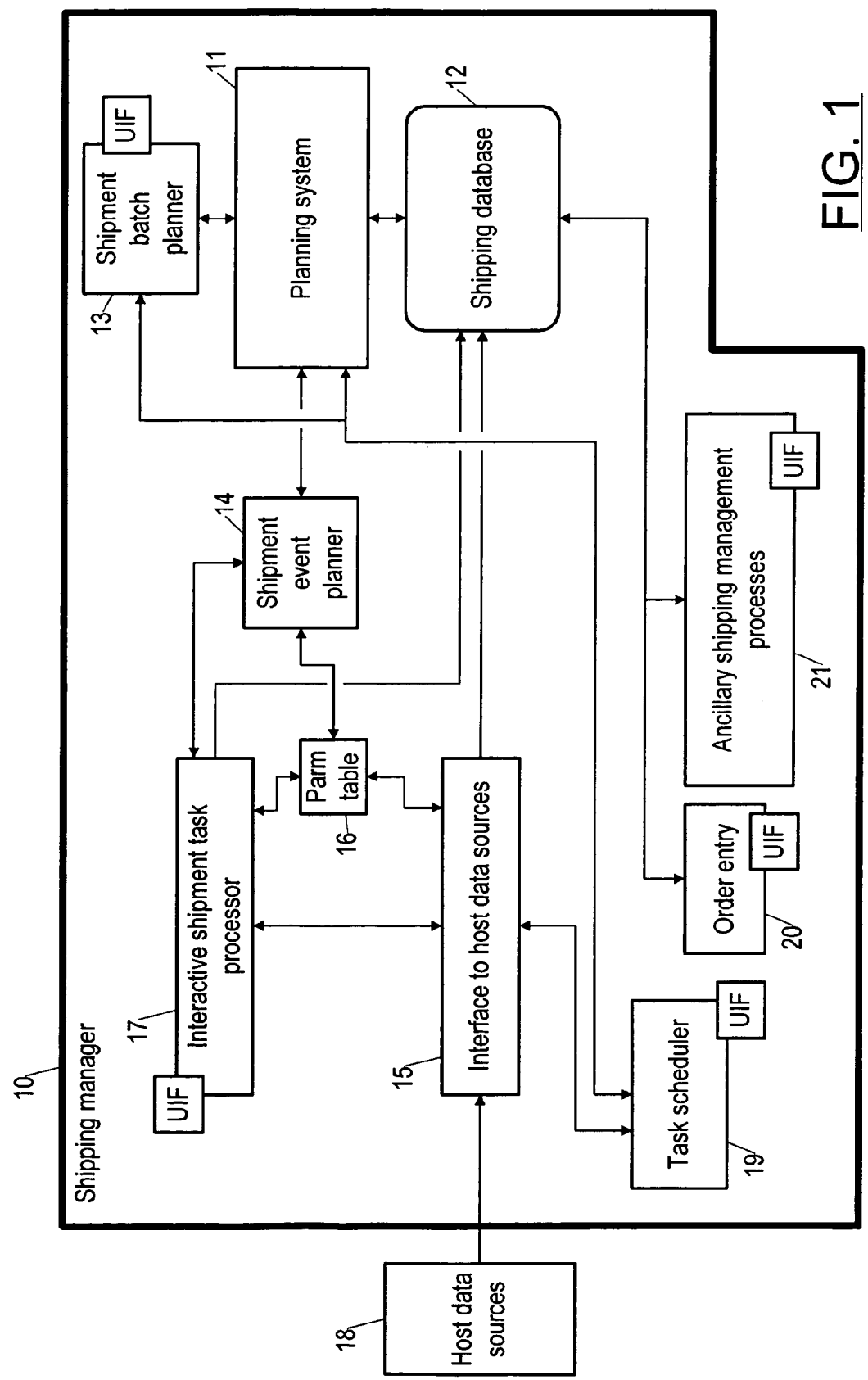
FIG. 1 is a block diagram of a shipping manager according to the present invention, with oriented lines indicating the direction of dataflow.

Referring now to FIG. 1, a shipping manager 10 according to the present invention is a system for managing all aspects of shipping a parcel, from order entry creating for the shipping manager a requirement to ship the parcel, to picking and packing items to be included in the parcel, to getting the parcel to its destination according to any constraints on its shipment. The shipping manager 10 can be used as a standalone application, preferably executing under Microsoft Corporation's WINDOWS 95 operating system or a more recent similar operating system. It can also be executed on a server attached to a network. Finally, it can be used in concert with other, independent shipping related applications, and when used in this mode, can extract data from host data sources 18 of the independent shipping related applications for integration into its own various data stores.

The invention will now be described, with reference to FIG. 1 and also to FIG. 2, in terms of a scenario in which a user, called here a seller, who is an employee of a direct seller of (personal computer) business systems, has received an order for a business system to be shipped to a customer (consignee), a business. In the scenario, the shipping manager 10 executes in the standalone mode. The seller has agreed to ship the business system according to a prior understanding with the customer business. The agreement is that a business system is to be shipped so as to arrive no later than two weeks from the date of the order for the business system, and otherwise is to be shipped as inexpensively as possible. The business system includes various items, such as a computer according to the consignee's specification, a monitor, and a keyboard and mouse.

Figure 2:
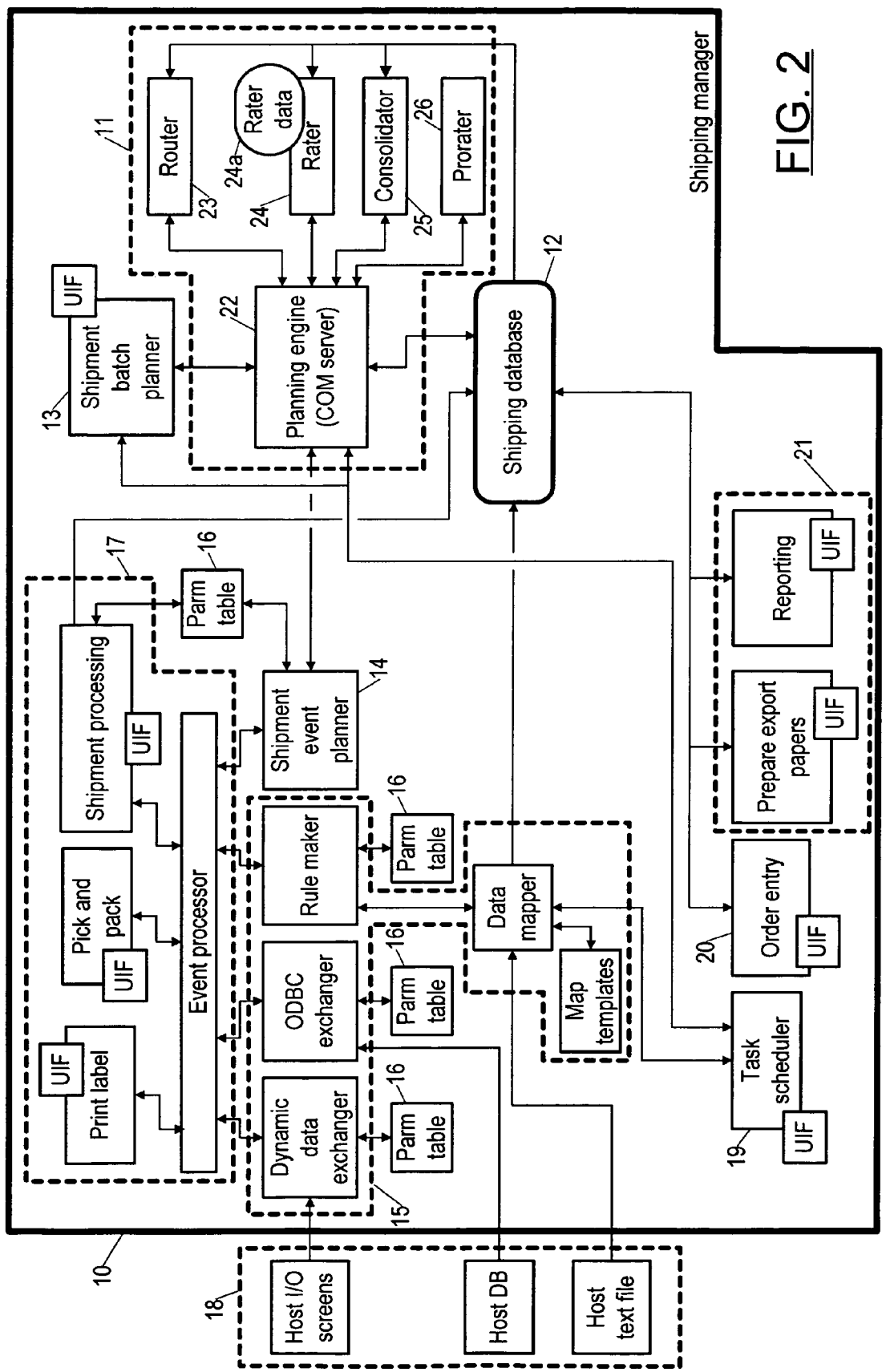
FIG. 2 is another block diagram showing the shipping manager of FIG. 1 in greater detail.

Still referring to FIG. 1 and also to FIG. 2, the seller enters the order through a user interface (UIF) provided with an order entry module 20, which stores the order in a shipping database 12. The order includes, in general, a shipper, service (ground, overnight, and so on), charge terms, payment terms, ship-to address information, and a recitation of each item ordered. In the present scenario, however, the shipper and service are not specified.

An order can be entered in other ways besides using the order entry module 20. An order can also be entered via electronic data interchange (EDI), for which the system provides an EDI interface (not shown). An order can also be entered by downloading it from a host system file via a data mapper included as part of an interface 15 to host data sources, which is described below.

Next, the seller engages an interactive shipment task processor 17, including a pick and pack module (see FIG. 2), and uses the pick and pack module to pick the items ordered from stock and to place them into shipping resources such as cartons, pallets and containers. The shipping manager keeps track of the contents of each resource and also, conversely, the resource in which each item ordered is packed. It can automatically assign resource numbers or use user-supplied identifiers. In the present scenario, all of the items are packed in a single resource to which the shipping manager 10 automatically assigns a resource number.

With the items picked and packed, the seller engages a shipment processing module (FIG. 2), which is another module of the interactive shipment task processor 17. The shipment processing module enables the user to arrange for shipping the ordered items, now all associated with a single resource in this scenario. In general, though, an order can be packed into several different resources and can then be divided up into several shipments. In the scenario, the resource is an entire shipment, i.e. a shipment is created that contains only the single resource that in turn includes all of the items ordered by the customer.

The first thing to be done in shipment processing is to route the shipment. Essentially, routing consists of identifying what carriers and services could be used to deliver the shipment, given any routing instructions provided by the consignee. Routing instructions are an example of a so-called business rule, and the shipping manager 10 allows using conditional logic ("if then" logic) to express the business rules. For example, a routing instruction (business rule) might be: if a shipment is going to Chicago, then use Alpha Freight Service. The shipping manager 10 allows the simultaneous application of various business rules. So, for example, in addition to the Chicago rule, the shipping manager 10 might apply the following rules: if expected delivery is Saturday, then use Bravo Freight Service; and if a shipment weighs 400 to 1,500 lbs., then use Charlie Freight Service.

The business rules can be stored in the shipping database 12 (each rule being saved using a route ID as an index for retrieving the rule), and can be created through the shipment processing module (FIG. 2) of the interactive shipment task processor 17, or through the shipment batch planner 13. In addition, business rules can be extracted from host data sources 18, via an interface 15 to the host data sources, provided to the interactive shipment task processor 17, and optionally saved to the shipping database 12. It is also possible, using the interactive shipment task processor 17, to have the shipping manager 10 retrieve as needed some or all business rules from the host data sources 18, and in particular from a host text file (FIG. 2) that is part of the host data sources 18.

The system provides for business rules not only for a consignee, but for shippers, third parties, and bill-to-addressees. Business rules can be prioritized based on charge terms of the shipment, typically based on who is paying for the shipping. Other bases for prioritizing are also possible, such as origin of a rule, i.e. whether the rule is a consignee-rule, shipper-rule, third-party-rule, and so on. A route priority table is used determine priority, as discussed below.

In the scenario here, the consignee has as a business rule the agreement noted above, namely that a business system is to be shipped so as to arrive no later than two weeks from the date of the order for the business system, and otherwise is to be shipped as inexpensively as possible. The business rule is stored in the shipping database 12.

In the scenario, then, the shipment is routed by applying the business rules on file (in the shipping database 12) for the consignee. The result of the routing is that various carriers and services are acceptable (because the identified carriers provide the identified services in shipping to the consignee's address), at least according to the business rules on file for the consignee. Specifically, Alpha, Bravo and Delta are all possible choices, using as the service of each either ground or air.

The routing is performed by the planning system 11, invoked by the interactive shipment task processor 17. As shown in FIG. 2, the planning system 11 includes a planning engine 22 that is a component object module (COM) server, as well as various modules that can be called by the planning engine 22: a rater 24, a router 23, a consolidator 25, and a prorater 26. A COM server, such as is available with Microsoft WINDOWS 95 and later versions and also with Microsoft WINDOWS NT, uses a standard interprocess communication protocol to effectively perform a run-time linking of processes that execute as standalone modules. It is used especially for implementing a distributed application enabling component standalone modules to cooperate to accomplish the overall aims of the application. The component processes may even exist on different computers connected through the Internet.

The interactive shipment task processor 17 invokes the planning system 11 through the action of a shipment event planner 14. Within the interactive shipment task processor 17 (FIG. 2), individual modules such as the shipment processing module, engage the shipment event planner through an event processor. The shipment processing module creates an event to be processed. Here, with the shipment identified as ZZZZ, so as to get the shipment routed, the shipment processing module creates as an event: route shipment ZZZZ. An event processor (FIG. 2) then invokes the shipment event planner, which in turn engages the planning engine 22 of the planning system 11. The planning engine 22 then activates its router 23, which extracts from the shipping database 12 any business rules on file for the consignee, and determines a list of candidate routes, each acceptable according to the business rules on file.

In general, the event processor responds not only to individual events, but also to associated subevents. If an event has subevents, the event itself is termed a master event. As an example, a master event can be defined to be "rating a shipment." Subevents can then be defined to be "rating and updating the shipment" and "saving it" (to the shipping database 12), "creating a label" (through the print label module of the interactive shipment task processor 17), and "validating the shipment's fields," i.e. each field of a shipping label, such as the fields indicating the consignee's name and address. The shipping manager 10 includes a set of pre-determined master events to which the seller (shipper) can add subevents. The seller can also add other master events and sub-event for the other master events.

Having routed the shipment and so determined what carriers and services are possible, the seller must next rate the different routes, i.e. determine which to use, assuming that more than one possible route is provided as a candidate route by the router 23 function. For the rating, the seller again uses the interactive shipment task processor 17, and in particular the shipment processing module. The seller inputs to the event processor, as an event to be processed, the rating of the shipment. The event processor then engages the shipment event planner 14, which in turn invokes the planning engine 22 of the planning system 11. The planning engine 22 first uses a rater (module) 24 (FIG. 2), which is part of the planning system, to determine the least expensive of the candidate routes. The rater 24 includes static rater data 24a, such as tariffs for the different services of various carriers, in an associated set of tables accessible only by the rater module 24. It uses the rater data 24a to determine a cost for each candidate route. In the scenario, the rater 24 determines that Alpha Freight Service seven-day service is the least cost route.

In general, though, the router 23 and rater 24 are caused by the planning engine 22 to work in concert to select a carrier based on a range of parameters. Carriers can be pre-selected, based on data passed from the order processing system. Alternatively, selection can be guided or even determined by routing instructions (business rules). Finally, carriers can be selected by a combination of business rules, routing, and rating, as in the scenario.

Another means by which the seller can tailor route selection is to define a group of carriers to be considered in rating a shipment. Then only a carrier in the defined group is rated. Another means is to allow the seller to apply a penalty to any rating for a predetermined carrier so that the selection of the carrier is less likely compared to other carriers, even if the disfavored carrier has a route at a same or better cost compared to the other carriers.

The actions taken by the shipping manager 10 in performing its routing and rating functions, based on what business rules or other guidance have been prescribed, are as indicated in table 1.

As shown in table 1, it is possible to have specific routing instructions, i.e. a specific route (carrier and service), and in such a case, no routing and rating is performed; the specified route is used. Specified routing instructions are provided either by the customer at order entry or as business rules.

Table 1 also shows that it is possible to have shipping instructions (provided by the records with a same route ID) provided by two sources, such as the shipper (the seller in the scenario) and the consignee for a shipment (the customer in the scenario). If these conflict, then the shipping manager uses a route priority table to determine which instructions are to be given precedence. Usually, precedence will be given to the instructions from the entity paying for the shipping charges. Table 1. Rating actions taken by the shipping manager depending on instructions for routing.

| Carrier | Service | Rate Shop Group | Routing Instructions (Route ID) | Both shipper and consignee have routing instructions | Action |
| --- | --- | --- | --- | --- | --- |
| no | no | no | no | no | Shop all carriers and services in system. |

-continued

| Carrier | Service | Rate Shop Group | Routing Instructions (Route ID) | Both shipper and consignee have routing instructions | Action |
|---|---|---|---|---|---|
| no | no | no | no | YES | Use route priority table to determine whose instructions are to be followed. |
| no | no | no | YES | n/a | Use route instructions from ShipHder Route ID. |
| no | no | YES | n/a | n/a | Shop all carriers in the rate shop group. |
| no | YES | n/a | n/a | n/a | Shop all carriers supporting the service. |
| YES | n/a | n/a | n/a | n/a | Shop all services for the specified carrier. |
| YES | YES | n/a | n/a | n/a | Use specified carrier and service. |

In the scenario, with the shipment routed and rated, the seller can print a label using the print label module of the interactive shipping module 17. The seller can print a carrier label (specific to a particular carrier including mail labels) or a regular shipper label. In addition, the seller can print a billing label, a bill of lading, or a hazardous materials label. Some of the labels can be printed from other interfaces besides those provided by the interactive shipment task processor 17, such as a shipment batch planner 13 and an end-of-day processing module (not shown).

Finally, if the shipment of the scenario were for a foreign country, the seller could create export documentation using the prepare export papers module of an ancillary shipping management processes module 21. For monitoring the shipment in particular, or for monitoring more generally, the shipping manager 10 includes a reporting module as one of the ancillary shipping management processes module 21. The reporting module extracts report data from the shipping database 12.

In the scenario, the seller interactively processed an order using the shipment processing module (FIG. 2) of the interactive shipment task processor 17. The shipping manager 10 also allows batch processing of orders after they are entered into the system by the order entry module 20 or by other means, including electronic downloading from remote order entry locations (not shown). To arrange for batch processing of an order, the seller uses a task scheduler 19 to indicate that shipping for an order is to be planned in batch mode, and then, still using the task scheduler, can prompt a shipment batch planner 13 to batch process any shipments in the shipping database marked for batch processing. (The shipping manager also allows the seller to use the shipment batch planner 13 to initiate the batch processing of any shipments in the shipping database 12 marked for batch processing.)

The shipment batch planner performs the same functions for each shipment in a batch of shipments as the interactive shipment task processor performs for a single shipment, i.e. it performs routing and rating using the planning system 11. However, in batch processing mode, the planning system 11 also iterates in its planning to take advantage of opportunities to consolidate shipments in the batch. The planning engine 22 of the planning system 11 invokes a consolidator (module) 25 (also part of the planning system 11) to attempt to consolidate any or all shipments in the batch of shipments, unless there are instructions not to consolidate. If the consolidator 25 is able to consolidate a shipment with one or more other shipments, the planning engine 22 will then prorate the shipment by invoking a prorater 26, also part of the planning system 11.

In attempting to consolidate shipments, the consolidator 25 searches the batch of shipments for all shipments having matching required properties. Usually these will include the shipper, consignee, and shipment date. However, it is also possible that other properties must match for a consolidation to be possible. For example, it is possible that a carrier is pre-specified. In all, the consolidator 25 can require that the following properties match in order for a consolidation to be acceptable: shipment date, shipper, consignee, bill-to, pre-specified carrier, pre-specified service, charge terms, inbound versus outbound, rate ship group, route ID, required delivery date, and hazardous commodity.

Next the consolidator 25 creates a routing list of carriers that can handle the shipment. Then it consolidates shipments based on either a least restrictive or a most restrictive bases. In the least restrictive basis, a carrier is selected from the routing list that can meet the earliest required delivery date specified on any shipment in the consolidation. In the most restrictive basis, a carrier is selected from the routing list that can meet the latest required delivery date specified on any shipment in the consolidation.

The task scheduler 19 also allows scheduling any other kind of task performed by the shipping manager 10. Tasks that can be scheduled include: sending and receiving pre-defined electronic data interchange (EDI) transaction sets; emptying database tables; placing shipments in a group with pre-defined selection criteria; packing a group of orders with pre-defined criteria in batch mode; printing bills of lading with pre-defined selection criteria; printing pick tickets with pre-defined selection criteria; printing a pre-defined report; purging a pre-defined group and its loads and shipments; purging shipments and orders based on pre-defined selection criteria; running a batch or executable file synchronously; rating and planning a pre-defined group of shipments; and creating a small package manifest based on pre-defined selection criteria.

Some of these tasks involve updating the shipping database 12 based on information in the host data sources 19, and in particular based on information in host text files (FIG. 2), as one component of the host data sources 19. For these tasks, the task scheduler 19 is used to schedule the data mapper (FIG. 2), of the interface 15 to host data source, to update the shipping database 12 based on information in the host text files. The data mapper then uses map templates (FIG. 2) to determine what data in the host text files maps into what field in the shipping database. The data in the host text files is often in a fixed format; then the map templates indicate (usually in terms of row and column) the beginning of a data item in a host text file, and by a format specification or other means indicate a length of the data item to be mapped.

The interface 15 to host data sources enables a host application and the shipping manager to share various data. The sharing is enabled by dynamic data exchange (DDX) provided by a dynamic data exchanger; by an open data base connectivity (ODBC) exchanger, for exchanging data items maintained in the shipping database and in a host database; and by a data mapper, which acquires data from text files in a host environment and provides data to the host environment as text files. The data mapper is used in particular for acquiring business rules for guidance in routing, possibly expressed using conditional logic.

As explained above, an order can be entered by downloading it from a host system file via the data mapper included as part of the interface 15 to host data sources.

FIG. 2 shows that the dynamic data exchanger module, ODBC exchanger module and rule maker module of the interface 15 to host data source share information via a parameter table (parm table) 16. Other modules also use the parm table 16 to share data. For clarity, the parm table 16 is shown as several different blocks in FIG. 2, although each block represents the same physical parameter table.

The Planning Engine

Figure 3:
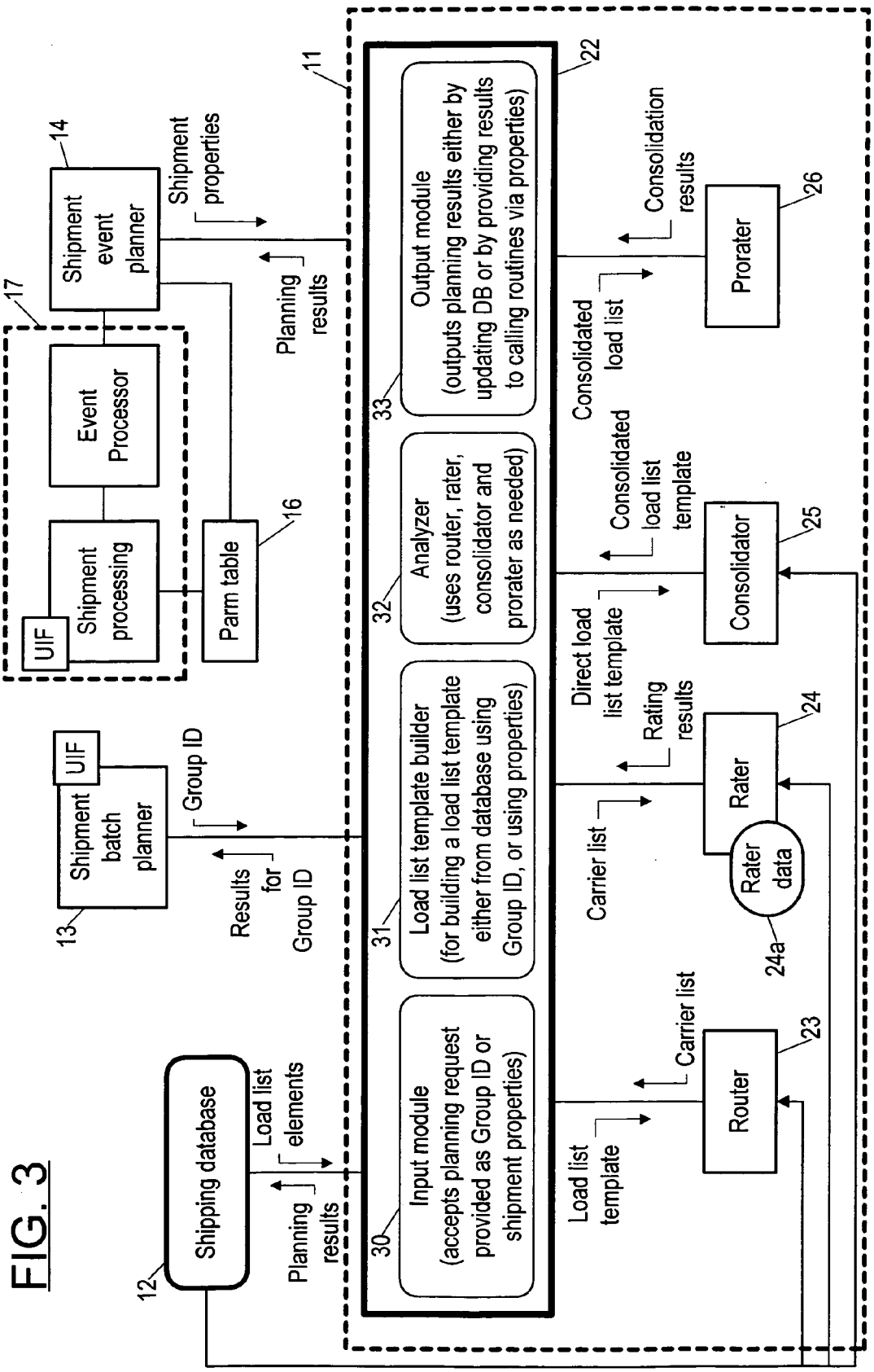
FIG. 3 is a block diagram showing in more detail the planning engine of the present invention.

Referring now to FIG. 3, the planning engine 22 of the planning system 11 is shown in more detail as including: an input module 30 for accepting a planning request (as either a Group ID indicating a group of shipments, or as properties of a data object indicating a single shipment and passed in memory to the planning engine); a load list template builder 31 for building a load list template (a list of at least one shipment with some elements, such as costs, to be determined later in the planning process); an analyzer 32 for performing the planning for each shipment of the load list template and so for determining an actual load list (i.e. for providing values for the null-valued elements of the load list template); and an output module 33 for providing the results of the planning either to a calling module (either the shipment event planner 14 or the shipment batch planner 13) or to the shipping database 12.

As used here, a load list is a list of each item included in a shipment (parcel), along with associated information, as described below. A load list can be built up from information in the shipping database 12, given the Group ID, i.e. a label (key) indicating a group of items to be included in a shipment. Such a key would be provided by the shipment batch planner 13 either in response to being scheduled to perform planning for a batch of parcels, or in response to a user commanding the planning of a batch of parcels using the user interface provided as part of the shipment batch planner 13. Alternatively, in case of interactive (one-at-a-time) parcel shipping planning, a load list can be built up using shipment properties provided by the shipment processing module (of the interactive shipment task processor 17) via the shipment event planner 14.

Still referring to FIG. 3, as mentioned above, the planning engine 22 calls one or another of various utility modules in performing shipment planning. After first building the load list as a template (i.e. with missing costs), the planning engine 22 calls the router 23, passing it the load list template. After examining each shipment of the load list template in turn, the router 24 returns a list of acceptable carriers and services, at least one carrier and service for each shipment of the load list template, the carriers and services being acceptable in that they satisfy any existing routing requirements (such as provided by business rules or by ad hoc instructions).

Next, the planning engine 22 calls the rater module 24, passing it the carrier list determined by the router 23. The rater 24 again examines the routes determined for each shipment in turn, figuring a rate for each possible carrier and service for each shipment, and passing to the planning engine 22 its rating results, indicating a rate for each route for each shipment. In determining the rates, the rater module 24 uses an associated data file, the rater data 24a, that includes information needed to determine the costs associated with each route.

In some circumstances it makes sense to attempt to consolidate a shipment with others. The planning engine 22 attempts to consolidate shipments in case of its being called by the shipment batch planner 13 (as opposed to the shipment processing module of the interactive shipment task processor 17) and being provided with a batch of parcels for which to plan shipping. Unless there are routing instructions that rule out the possibility of consolidating the parcels, the planning engine 22 will call the consolidator 25 (FIG. 3), which will attempt to determine one or more possible consolidations of the parcels in the batch. To determine possible consolidations, the planning engine provides the consolidator 25 with the same load list template as it originally provided to the router, i.e. a direct load list template. In return, the consolidator provides a consolidation load list template indicating possible consolidations of the loads of the direct load list template. (The structure of a direct load list and a consolidation load list is described below.)

If the consolidator is able to determine possible consolidations, it returns a consolidation load list template and the planning engine then performs the same routing and rating, using the router 23 and the rater 24, as it performed for the original (direct) load list template. To determine whether a consolidation is advantageous, the planning engine 22 then calls the prorater 26 (FIG. 3), which determines the prorated cost of each parcel (shipment) in each consolidation.

Figure 4:
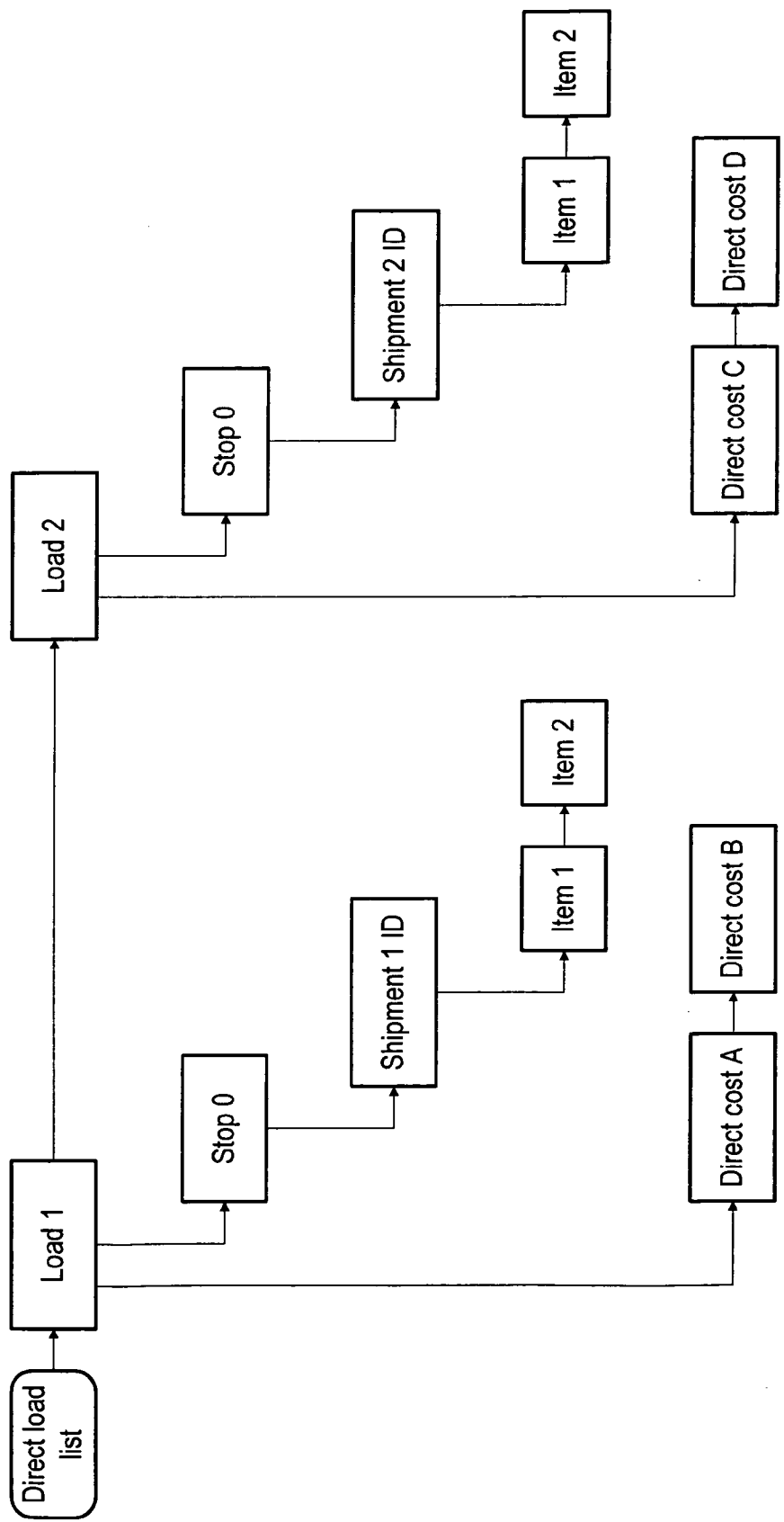
FIG. 4 is a data structure diagram indicating the structure of a direct load list, used in case of a direct shipment.

Referring now to FIG. 4, a direct load list as constructed by the planning engine 22 is shown as a list of loads (load 1, load 2, and so on), each load being associated with a single shipment (as opposed to the usual use of load, to indicate a set of shipments), indicated as a shipment ID. Each load is a record containing two lists, one for the items of the load/shipment (item 1, item 2, and so on for load 1, and similarly for load 2), and the second for the component shipping costs for shipping each load (direct cost A, direct cost B, and so on for load 1, and similarly, direct costs for the items of load 2). (For example, the shipment might have a cost associated with its basic overnight service, a cost for an inside pickup, and a cost for an inside delivery.) A stop in a load list is a final destination for a shipment. The planning engine 22 constructs a direct load list using the load list template and using the results obtained from the router 23 and the rater 24.

Figure 5:
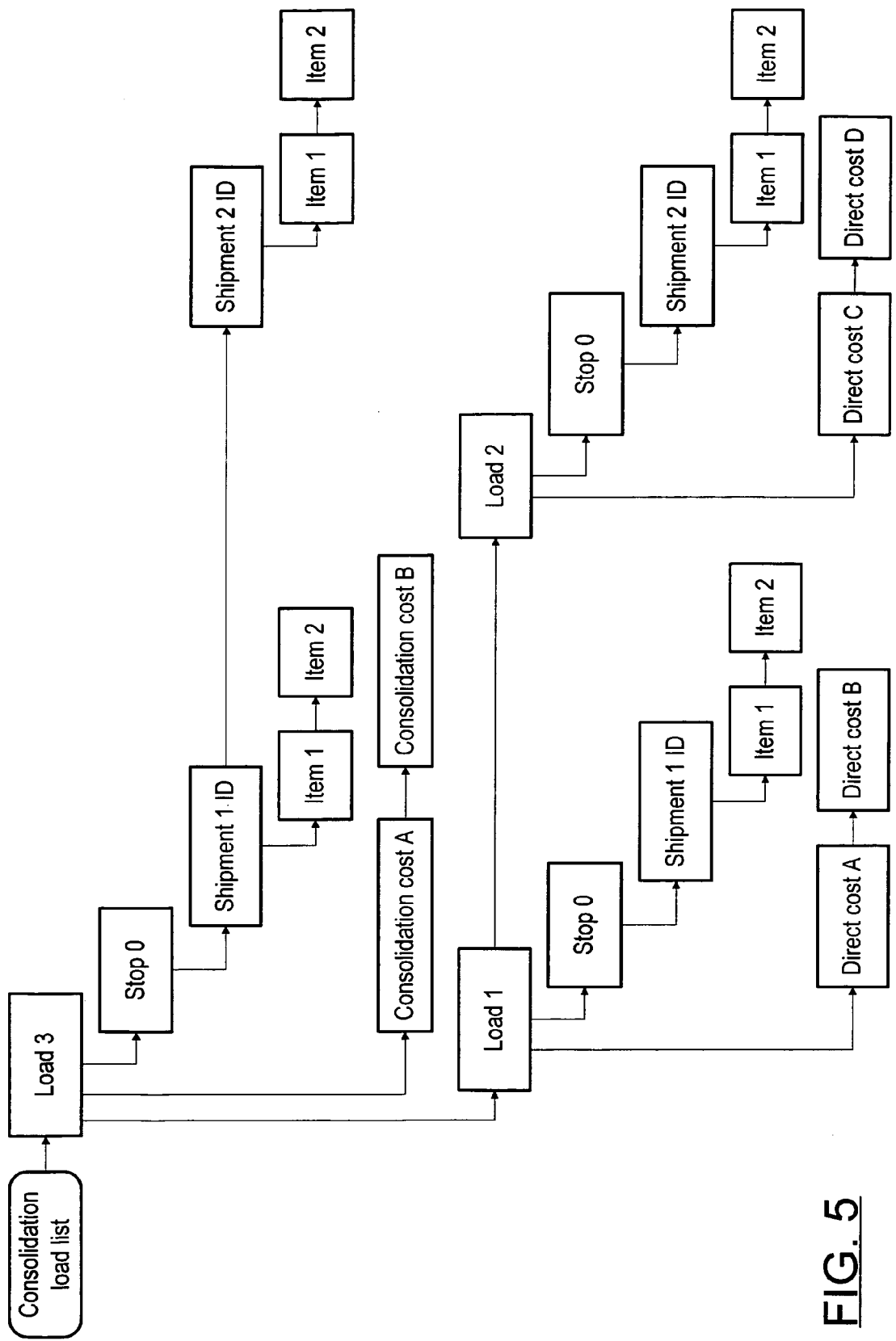
FIG. 5 is a data structure diagram indicating the structure of a consolidation load list, used in case of a consolidating two or more shipments.

Referring now to FIG. 5, a consolidation load list is shown as including a consolidation load (Load 3), and also including the direct load list (the list having items Load 1 and Load 2) from which the consolidation load was constructed. The direct load list (Load 1 and Load 2) is included in the consolidation load list in case of needing to de-consolidate a load. The consolidation load (Load 3) is then discarded, and what remains is simply the direct load list (Load 1 and Load 2) from which the consolidation load (Load 3) was constructed.

The consolidation load (Load 3) is shown as including all of the shipments of the corresponding direct load list (i.e. shipment 1 and shipment 2), and having various component costs (consolidation cost A, consolidation cost B, and so on) associated with the consolidation load (Load 3), component costs similar to the component costs for each shipment in a direct load list.

After performing a consolidation, the planning engine 22 calls router 23 and rater 24 to perform the same analysis as if the consolidation were a simple, direct load. When it does, it passes to the router 23 the consolidation load list with undetermined costs, which is therefore a load list template (but having the structure of a consolidation load list). In other words, a load list template can be either a template for a direct load list or one for a consolidated load list.

As explained above, after the rater 24 determines component costs for the consolidation using each of the carriers and services to be rated, the planning engine 22 calls the prorater 26 to determined how to prorate the costs among the constituent shipments. If as a result of the routing and rating of the consolidation, the planning engine 22 determines that the consolidation is not advantageous, then it will de-consolidate the load into its individual constituent loads/shipments using the associated direct load list included with the consolidation load list.

SCOPE OF THE INVENTION

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A planning engine executable on a computer for use in a planning system for planning the shipment of at least two items, the planning engine comprising:

an input module, responsive to a planning request for shipment of the at least two items for which planning is to be performed, for providing a list including each shipment for which planning is to be performed;

load list template builder module, responsive to the list including each shipment for which planning is to be performed, for providing a direct load list template including each item in each shipment;

a consolidation module for determining possible consolidations of shipments and providing a consolidated load list template indicating possible consolidations of shipments;

a router module, responsive to the direct load list template and consolidation load list template, for determining possible routes for each shipment of the direct load list template and consolidation of shipments of the consolidated load list template and providing the determined possible routes to the direct load list template and consolidated load list template, the router module using business rules to determine each possible route and prioritizing the business rules in case of conflict;

a rater module for determining rates for each possible route for each shipment and consolidation of shipments and providing the determined rates for each possible route to the direct load list template and consolidated load list template;

a prorater module for determining an apportionment of costs of the determined rates for a consolidation of shipments among the items included in the consolidated shipments;

an analyzer module, responsive to the direct load list template, consolidated load list template, and prorater module, for selecting one of the direct load list template and consolidated load list template based on prorated costs for each shipment included in the consolidated shipments and providing a load list based on the selected one of the direct load list template and consolidated load list template indicating a carrier and service for each shipment of the load list template or consolidated load list template; and an output module, responsive to the load list, for outputting the load list indicating a carrier and service for each shipment of the direct load list template or consolidated load list template.

2. A planning engine as in claim 1, wherein the planning engine is implemented as a component object module (COM) server.

* * * * *